(12) United States Patent
McGibney (10) Patent No.: US 6,606,312 B1
(45) Date of Patent: Aug. 12, 2003

(54) ANALOG RADIO SYSTEM WITH ACOUSTIC TRANSMISSION PROPERTIES

(75) Inventor: Grant McGibney, Calgary (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 09/275,981

(22) Filed: Mar. 25, 1999

Related U.S. Application Data (60) Provisional application No. 60/091,794, filed on Jul. 6, 1998.

(51) Int. Cl.$^7$ .................................................. H04J 3/00
(52) U.S. Cl. ........................................ 370/345; 370/521
(58) Field of Search ................................. 370/329, 330, 370/336, 345, 349, 350, 498, 536, 537, 538, 540, 542, 543, 544, 521

(56) References Cited

U.S. PATENT DOCUMENTS

| | | | |
|---|---|---|---|
| 4,034,295 A | | 7/1977 | Kotezawa et al. ............. 325/39 |
| 4,864,301 A | | 9/1989 | Helferich ..................... 347/110 |
| 4,930,126 A | | 5/1990 | Kazecki et al. .............. 370/109 |
| 5,249,174 A | * | 9/1993 | Itoh ............................. 370/202 |
| 5,355,363 A | | 10/1994 | Takahashi et al. ............ 370/29 |
| 5,396,484 A | * | 3/1995 | Itoh ............................. 370/204 |
| 5,490,167 A | | 2/1996 | Sumi et al. .................. 375/219 |
| 5,493,698 A | | 2/1996 | Suzuki et al. ................. 455/72 |
| 5,553,079 A | * | 9/1996 | Niki et al. ................... 370/477 |
| 5,689,440 A | * | 11/1997 | Leitch et al. ............... 370/313 |
| 6,018,520 A | * | 1/2000 | Okada ......................... 370/336 |
| 6,125,120 A | * | 9/2000 | Lehtimaki ................... 370/435 |

OTHER PUBLICATIONS

Digital Communications, second edition, McGraw–Hill, 1989, J.G. Proakis, Chapter 7, Digital Signaling Over Fading Multipath Channels, p. 702–717.
Voices of Men and Machines, J.L. Flanagan, Journal of the Acoustic Society of America, vol. 51, pp. 1375–1387, Mar. 1972.
Time–compression–multiplex transmission, J.E. Flood and D.I. Urquhart–Pullen, Proc. IEE, vol. 111, No. 4, Apr. 1964, p. 647–668.
Time–Compressed Single–Sideband System (Ticoss)*, M.I. Jacob and J. Mattern, IRE Transactions on Communications Systems, vol. CS–6, pp. 2–8, Jun. 1958.
Gated capacitor store for t.c.m. transmission, J.E. Floor and D.I. Urquhart–Pullen, Proc. IEE, vol. 111, No. 4, Apr., 1964, p. 669–674.
Communication Systems: An Introduction to Signals and Noise in Electrical Communication, A. Bruce Carlson, third edition, McGraw–Hill, 1986, p. 319–322.

* cited by examiner

Primary Examiner—Kwang Bin Yao
(74) Attorney, Agent, or Firm—Christensen O'Connor Johnson Kindness PLLC (57) ABSTRACT

This invention modulates voice signals so that the radio waves behave the same in the radio medium as sound waves would in the acoustic medium. This is accomplished by segmenting the voice signal and compressing the segments in time before transmitting them through the radio channel. If the compression factor is correct, the distortion sounds natural to the ear because the characteristics of the radio channel match those normally encountered in the acoustic channel. The radio signal will then inherit many of the good properties of acoustic voice signals including resistance to flat fading and tolerance of frequency selective fading.

29 Claims, 5 Drawing Sheets

ANALOG RADIO SYSTEM WITH ACOUSTIC TRANSMISSION PROPERTIES

This application claims the benefit of the filing date of U.S. Provisional Patent Application Serial No. 60/091,794, filed Jul. 6, 1998.

BACKGROUND OF THE INVENTION

Human verbal communication has evolved into a very effective method of carrying information via sound waves, despite the distortion introduced in the acoustic medium. Although the radio medium is similar to the acoustic medium and presents similar challenges to effective communication, current radio systems do not exploit the natural abilities of the human aural system to deal with these challenges.

Both sound and radio waves propagate not just in a direct path from the transmitter to the receiver, but also by reflections off objects in the environment. This is known as a multipath channel. Reflected signals must travel a further distance than direct signals, therefore they arrive at the receiver later in time. The composite of all the signals from the different paths, each with a different amplitude and delay, make up the multipath channel. For a detailed discussion of the properties of multipath channels see Proakis [1].

The behavior of a signal in a multipath channel depends on whether it is wideband or narrowband. Narrowband signals experience little or no distortion as they pass through the channel other than additive white noise. The received power level does, however, fluctuate drastically due to a process called flat fading, which causes the signal to be lost entirely at times. In contrast, the overall power level of wideband signals is relatively stable. A process called frequency selective fading distorts the wideband signal in the time domain to cause intersymbol interference, and distorts the frequency domain with narrow regions of frequencies that are severely attenuated. Wideband radio systems are desirable because they avoid the problem of narrowband flat fading. However, to use a wideband system the receiver must be able to deal with the distortion of frequency selective fading.

The main difference between the radio and acoustic multipath channels is the delay spread. Delay spread is the difference in time that it takes the signal to pass through the shortest path versus the time through the longest significant path. The inverse of delay spread is roughly the coherence bandwidth of the channel, which is the benchmark for defining the type of the signal. The signal is narrowband if the signal bandwidth is much less than the coherence bandwidth. It's a wideband signal if its bandwidth is much greater than the coherence bandwidth. In a small room, the acoustic delay spread may be 50 ms giving a coherence bandwidth of 20 Hz (the actual value varies considerably). The human voice uses a bandwidth of about 3 kHz, which is much greater than the coherence bandwidth of the acoustic channel and therefore voice is wideband in its natural environment. Radio waves propagate at a much greater speed than sound so even in a large area like a cellular radio cell, the maximum delay spread may be only 50 µs (again the actual value varies considerably). The coherence bandwidth of the radio channel, 20 kHz in this case, is greater than the bandwidth of the voice signal, therefore voice transmitted through the radio channel behaves like a narrowband signal. This is the reason that voice carried through radio experiences flat fading, and is subject to occasional signal loss, but voice carried through the acoustic medium does not.

One way of combating the effects of multipath is with spread spectrum signals. A spread spectrum signal is, by definition, a signal that occupies a much greater bandwidth than the signaling rate requires. Spread spectrum signals are most useful when the bandwidth of the signal is wide enough to avoid flat fading, while at the same time the signaling rate is low enough to avoid intersymbol interference. Modern direct sequence spread spectrum (DSSS) radios are one example of systems with this property. The human voice is another.

In direct sequence spread spectrum radios, the wideband signal is created by modulating a spreading code. The code is chosen to distribute the energy of the signal in a roughly uniform pattern across the entire frequency band so that there are no critical frequencies in the signal that could be attenuated by a frequency selective fade. As long as enough signal power falls outside the fades, the signal will get through.

The human voice is very similar to a DSSS radio signal. The bandwidth of the voice, about 3 kHz, is much greater than the signaling rate of two to five syllables per second, and therefore the voice is a spread spectrum signal. The voice bandwidth is much greater than the coherence bandwidth of the acoustic channel to avoid flat fading, and the syllables are longer than the delay spread of a typical acoustic channel to avoid intersymbol interference. The three types of sounds that make up a voice signal (voiced sounds, fricative sounds, and plosive sounds [2]) are all inherently resistant to frequency selective fading. The energy of all the sounds is distributed across the voice band to make them wideband, and none of the sounds contain any critical tones that may be lost to a multipath fade.

SUMMARY OF THE INVENTION

When translated to radio, the human voice does not make a good spread spectrum signal because its bandwidth is well below the coherence bandwidth of most radio channels. The purpose of this invention is to coerce the radio medium to behave like the acoustic medium when carrying voice. It does this by artificially increasing the bandwidth of the voice signal through time compression. After decompression, the signal from the radio channel sounds like a natural acoustic signal so there is no need for complex digital signal processing at the receiver to correct for multipath distortion. The signal processing is actually performed by the listener's ear and brain. Since the signal is wideband, it resists the problems of flat fading associated with narrowband radios.

The invention operates as follows. A segment of speech is sampled and stored within the radio. When storage is complete, the voice segment is replayed at a much higher sampling rate. This compresses the signal in time and expands it in frequency. In the example above, the coherence bandwidth of the radio channel is a thousand times that of the acoustic channel, so to achieve the required bandwidth expansion, the signal is played back at a sample rate a thousand times faster. The wideband voice signal is then modulated to radio frequencies using a single sideband (SSB) modulator, amplified, and broadcast though the antenna.

The receiver expands the signal in time to restore it to its original narrow bandwidth. After detecting the radio signal with a SSB demodulator, it is sampled at the high sample rate, stored, and played back at the low sample rate. Not only does this restore the signal bandwidth so the listener can understand the speaker, it also expands the effective impulse response of the radio channel. If for example the radio channel has a delay spread of 50 μs, the effective delay spread appears to be 50 ms after the signal is expanded which makes it sound like an acoustic channel.

The invention inherits many of the good properties of acoustic voice signals including resistance to flat fading. This allows the average power requirement for this invention to be substantially lower than an equivalent narrowband system. Extra power is normally added to narrowband signals to allow them to pass through all but the deepest flat fades. This fading margin may add 20 dB or more to the output power at the transmitter. The wideband signals of this invention, like acoustic signals, are not as susceptible to flat fading and the fading margin can be virtually eliminated.

Compressing signals in time is known, generally in radio communications, as time compression multiplexing (TCM). TCM was applied to telegraph signals in 1867, to voice telephony as early as 1943, and to radio systems by 1958 [3]. Previous applications of TCM, for example the system described by Jacob and Mattern [4], have been limited to multiplexing two or more signals into a common channel. This invention includes the following enhancements to TCM which gives it the property of transforming radio channel distortion into natural sounding acoustic distortion, and allows the human voice to act as a spread spectrum radio signal. The time compression factor of this invention is set specifically to map the normal range of delay spread encountered in the radio channel to the normal range of the acoustic channel. The modulation technique is chosen to be linear, so that the multipath characteristics of the channel are preserved, and must not rely on a transmitted carrier. And, a special precursor is included to prevent edge effect distortion from the relatively large delay spread of the wideband radio channel.

A digital control signal is time multiplexed with the compressed voice signals to provide system information to the radio including call setup, termination, handoff, etc. With little modification to the receiver, this digital control signal can also supply the analog portion of the radio with the information that it needs to synchronize the analog bursts, provide automatic gain control, and assist in carrier recovery.

Thus, according to an aspect of the invention, there is provided a method of radio communication, the method comprising the steps of time compressing a speech signal to form a time compressed speech signal, time multiplexing the time compressed speech signal with digital control signals to generate a TCM signal; and transmitting the TCM signal to a receiver.

According to a further aspect of the invention, there is provided apparatus for radio communication, the apparatus comprising a time compression circuit connected to receive a speech signal and having as output a time compressed speech signal, a multiplexer connected to receive the time compressed speech signal and a digital control signal and having as output a TCM signal, and a transmitter connected to receive and broadcast the TCM signal.

According to a further aspect of the invention, there is provided apparatus for radio communication, the apparatus comprising a receiver connected to receive a TCM signal including a time compressed signal and a control signal, a controller connected to receive the control signal, and a time decompression circuit connected to receive the time compressed signal and having as output a time expanded speech signal.

Further aspects of the invention are described in the detailed disclosure and the claims.

DETAILED DESCRIPTION OF THE PREFERRED EMBODIMENTS

Figure 1:
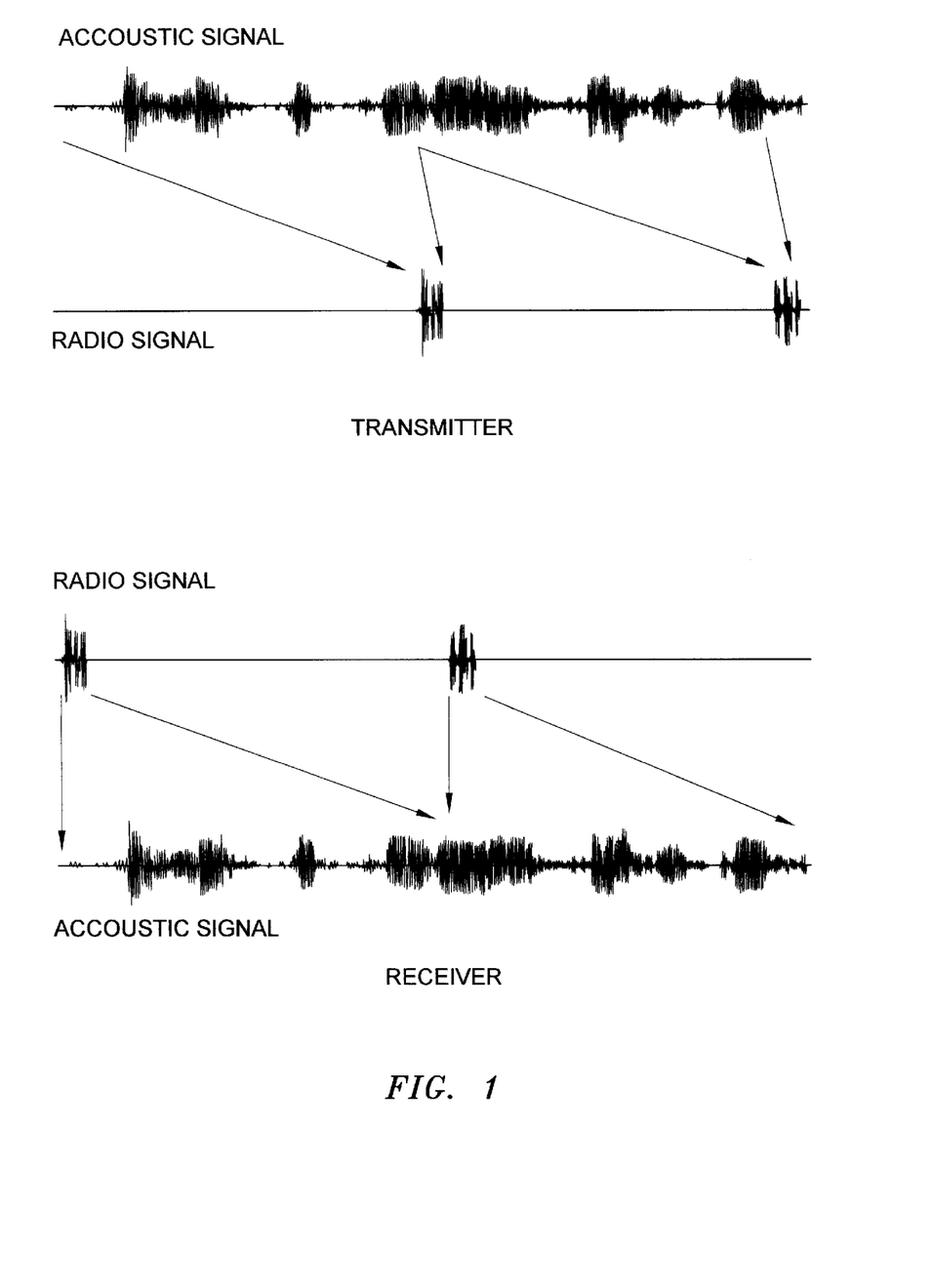
FIG. 1 illustrates the time compression operation in the transmitter of this invention and the time compression operation in the receiver.
Figure 2:
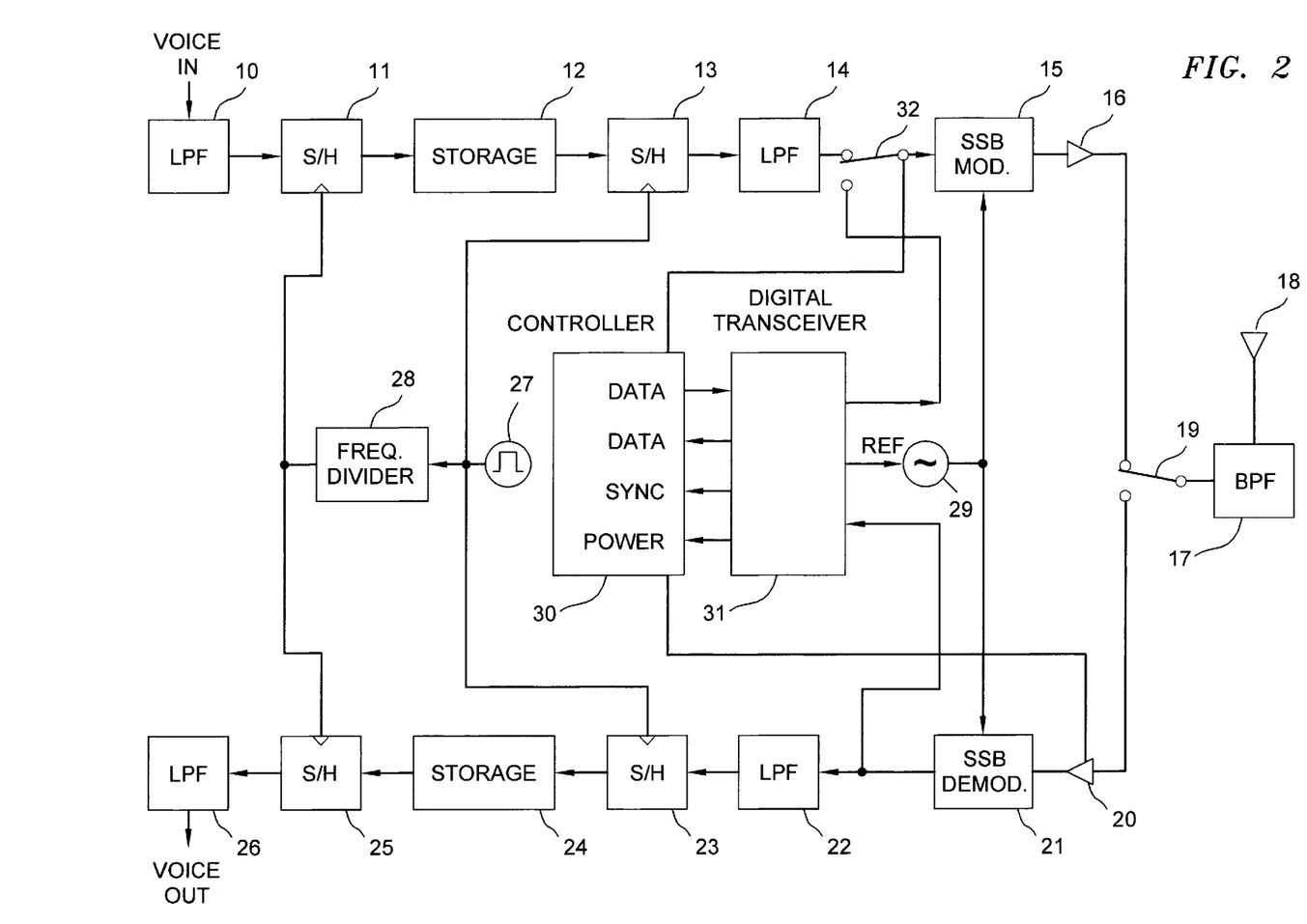
FIG. 2 is a schematic of the invention.

The operation of the invention's transmitter and receiver are shown in FIG. 1 and the apparatus that performs the operations in FIG. 2. The transmitter's purpose is to accumulate and store a segment of the voice signal within the radio and then broadcast a time compressed representation of that signal. The speech signal is passed through a low pass filter 10 and then sampled with an analog sample/hold circuit 11. The bandwidth of the filter 10 should be at least 3 kHz to pass a sufficient part of the voice spectrum, and be less than twice the sample rate of the sample/hold circuit 11 to satisfy the Nyquist sampling criteria and prevent aliasing. The voice samples are passed to an analog storage device 12 until an entire voice segment has been sampled. The samples are then clocked out of the storage device 12 to another sample/hold circuit 13 at a much higher rate. Low pass filter 14 if set to have a frequency cutoff of greater than the wideband voice signal but less than half the high speed sample rate to removed the aliased components of the signal. The wideband voice signal is then modulated to radio frequencies using a single sideband (SSB) modulator 15, boosted in strength by a power amplifier 16, filtered through a bandpass filter 17 to remove any out of band components, and broadcast though an antenna 18.

The receiver performs the opposite functions of the transmitter—accumulating the compressed packet internally and then expanding the signal in time to recover the original voice. To prepare for an incoming packet, switch 19 disconnects the antenna 18 from the power amplifier 16 and connects it to a low noise amplifier 20. The signal for the antenna is then bandlimited by the bandpass filter 17, boosted in power by the amplifier 20, and demodulated by single sideband demodulator 21. The signal is then passed through a low pass filter 22, which has the same passband as filter 14, sampled by a sample/hold circuit 23 and stored in an analog storage device 24. Sample/hold circuit 25 continuously clocks samples out of the storage device 24 at the slow sample rate to restore the signal to its original bandwidth. A low pass filter 26, with the same passband as filter 10, removes the aliased components of the output signal.

A common sample clock 27 generates the high rate sample frequency for both the transmitter and receiver. Frequency divider 28 reduces the high sample rate to the low sample rate by dividing clock 27 by the compression factor. A common RF signal source 29 generates the carrier for both the single sideband modulator and demodulator.

Figure 3:
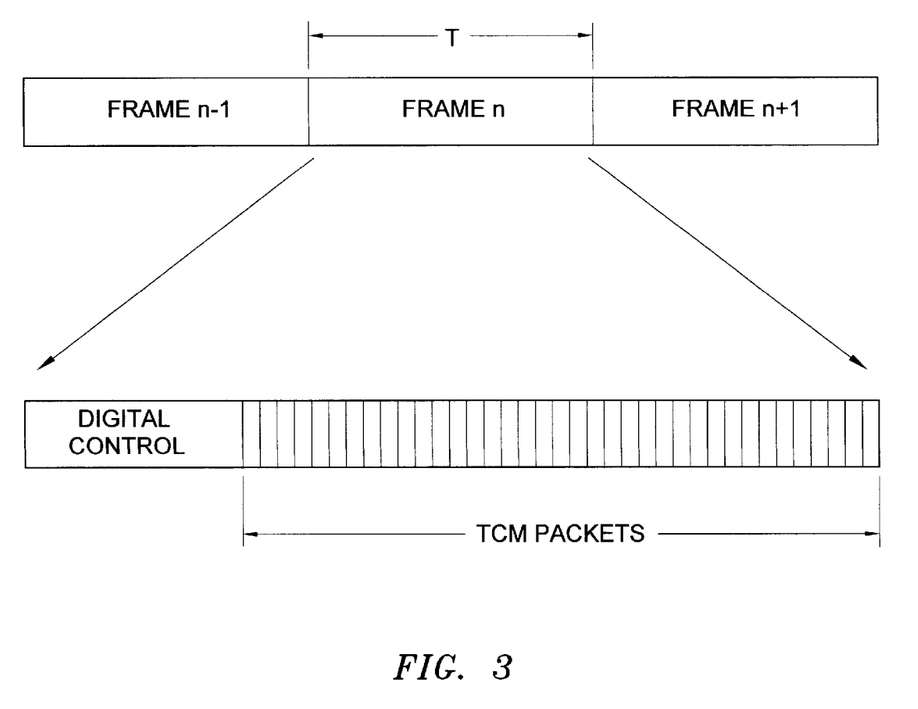
FIG. 3 shows the structure of the time frame including digital control section and analog TCM section.

Microcontroller 30 coordinates the sequence of events required to transmit and receive the voice signal. The microcontroller communicates with a corresponding microcontroller in the other radio set via a digital transceiver 31 through the same radio channel that carries the voice. This transceiver must provide a robust, low data rate connection through the multipath distortion of the wideband radio channel. A simple, fixed code, direct sequence spread spectrum transceiver is one example of a modulation format that would fit these needs. The digital control information—which includes call setup, termination, and handoff, plus any other digital services that are provided by the system—is time multiplexed with the analog signals as shown in FIG. 3. The system time is divided into a series of frames, where each frame is exactly the length of an uncompressed voice segment, T. Part of this frame is dedicated to digital connections between the various radios in the system and the rest of the time is used for the time compression multiplexed voice packets. Switch 32 controls whether the signal transmitted is an analog voice signal or a digital control signal.

The digital channel is also utilized to provide synchronization and power control information to the microcontroller 30. Placing the TCM voice packets at fixed offsets from the start of the digital control signal allows the digital demodulator's synchronization circuit to act as a time reference to the analog signals. If both the transmitting and receiving radio sets use the same offset, the short received packets will be sampled at the correct times. The digital channel also provides a means to measure the incoming signal power and correct for the changing path loss with automatic gain control. While it is possible to get an accurate measurement of the radio path loss by observing the signal strength of the digital signal, the same is not true of the analog signal. There is no component in the voice that can act as a constant power reference. However, since the analog and digital signals share the same radio channel, measuring the power level of the digital signal alone allows the microcontroller 30 to adjust the gain of input amplifier 20 so the power level is appropriate for both signals.

For the two digital transceivers to synchronize, their sample clocks must be adjusted to run at exactly the same frequency. This property is exploited to regenerate the frequency of the radio carrier by extracting the sample clock from the digital transceiver 31 to act as a reference frequency for the RF signal source 29. The RF signal sources in the two radio sets must provide reasonable enough accuracy without the reference signal to allow the digital transceivers to perform initial synchronization. Then, once synchronization is obtained, the RF sources in each radio both have the same reference frequency and can use that to generate RF carriers with almost identical frequencies.

Figure 4A:
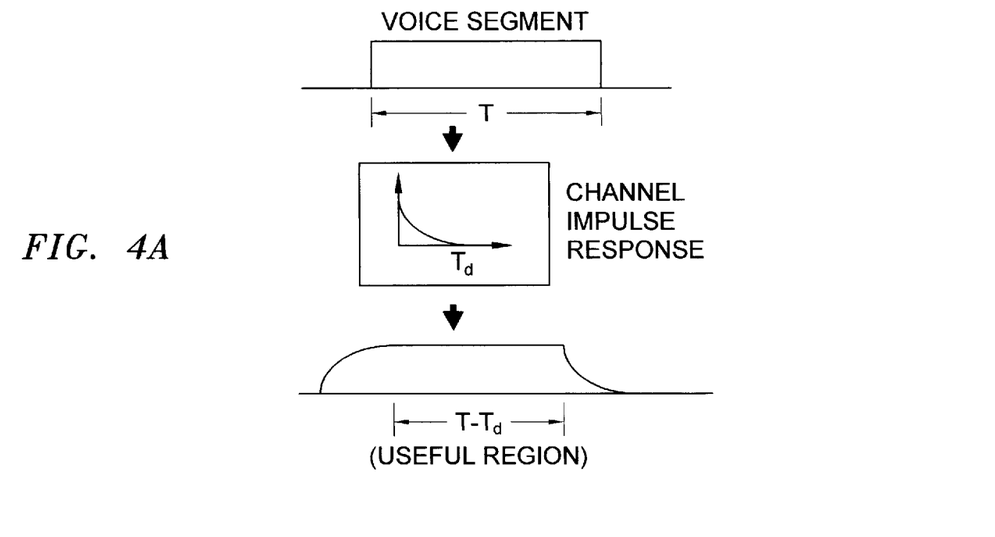
FIG. 4a shows the effect of the channel on an ordinary voice segment.
Figure 4B:
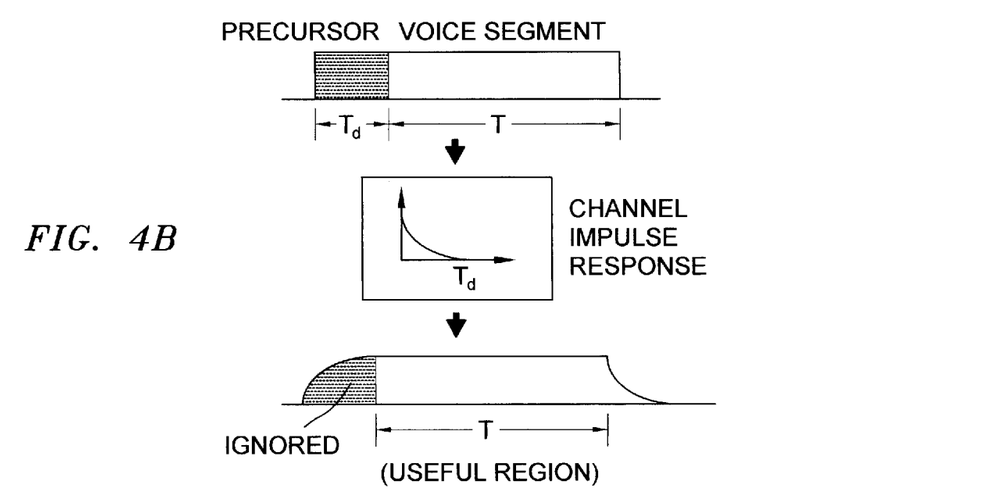
FIG. 4b shows the effect of the channel on a voice segment with the appropriate precursor.
Figure 4C:
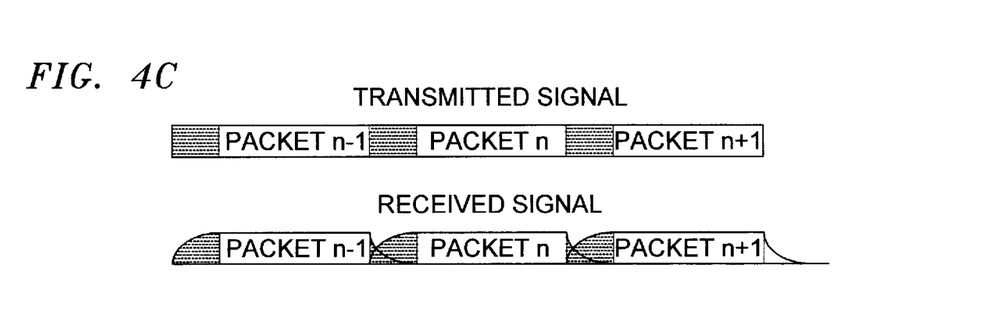
FIG. 4c shows how transmitted voice packets can be transmitted without interference.

Edge effects are generated when a segmented voice signal is sent through a multipath channel. If left uncorrected, these will cause part of the voice signal to be lost. FIG. 4a demonstrates the process by using a rectangle to represent a voice segment of length T. The delay spread of the channel causes the signal to spread out by $T_d$ seconds so there is a part of the signal missing near the beginning of the received segment and an extra signal tail added to the end. The edge effects reduce the usable part of the voice segment to $T-T_d$ seconds. To overcome this problem, a precursor is added to the beginning of each voice segment as shown in FIG. 4b. The precursor consists of the last $T_d$ seconds of the previous voice segment. The precursor is discarded at the receiver, however it does serve its purpose to move the edge effect away from the beginning of the true voice segment. The useful part of the voice segment is now T seconds long, which is enough to be reassembled back into a continuous voice signal. Since the precursors are ignored at the receiver, they also serve as effective guard periods. As demonstrated in FIG. 4c, the precursor makes is possible to have TCM voice packets spaced very close in time. The packets at the receiver will overlap, but only in the precursor region which is ignored. This eliminates the usual empty guard time in TCM systems and improves system throughput.

Figure 5:
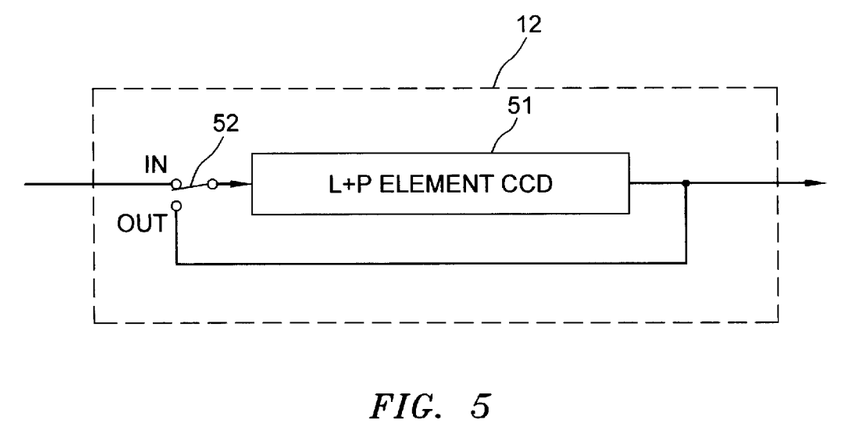
FIG. 5 shows the schematic of the transmitter's storage unit.

The precursor is generated in the storage device 12, shown in detail in FIG. 5. The storage device uses an array of charged coupled devices (CCD) 51, which is the modern integrated circuit equivalent of the gated capacitor storage unit used by Flood et al. [5]. The CCD array acts as an analog shift register with a number of elements. Each time that a clock signal arrives at the array, a new sample is added to the first element, and each other element is shifted one position towards the end of the array. The output of the array is equal to the value in the last element of the array. If a voice segment consists of L analog samples, and the required precursor contains P samples, then the CCD array must contain L+P elements in order to hold the entire transmitted packet, To pass the contents of the array to the high speed sample/hold circuit 13, the microcontroller first sets switch 52 to the "OUT" position. The samples are then clocked out of the array and passed to both the high speed sample/hold circuit 13, and back to the input of the array. The feedback path ensures that the array is returned to its original state after all L+P elements are clocked out. In the time between output bursts, switch 52 is moved to the "IN" position and L new samples are clocked in from the slow speed sample/hold circuit 11. The new samples displace all but the last P samples from the previous segment. These samples become the precursor for the new packet. The compression factor of this invention is so large that normally the entire contents of the array can be clocked out in the time between slow speed samples. If, however, a voice sample does arrive while the high speed packet is being clocked out, the microcontroller simply has to delay clocking the new sample into the array until the output burst is done and switch 52 is returned to the "IN" position.

Figure 6:
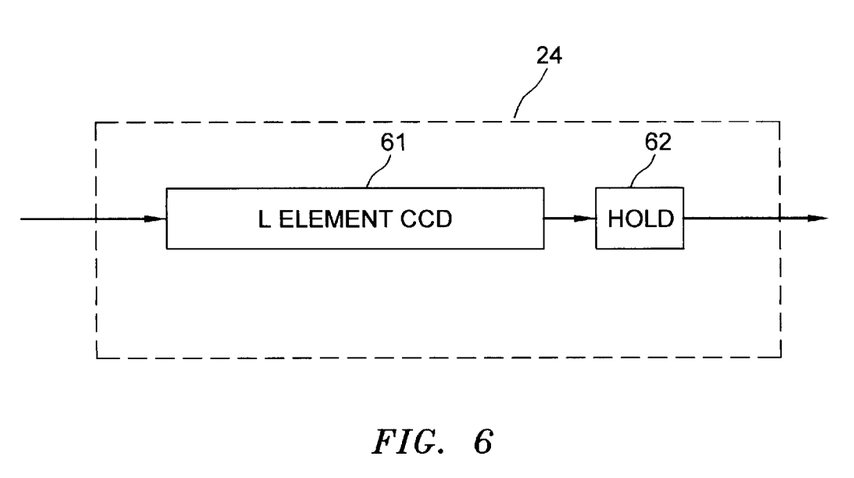
FIG. 6 shows the schematic of the receiver's storage unit.

The details of the receiver storage device 24 are shown in FIG. 6. In the receiver, the precursor is ignored so the CCD storage array 61 need only have L elements to hold the signal. In preparation for an incoming radio packet, the microcontroller activates the hold device 62, which holds the last sample of the analog array in case the slow speed sample/hold circuit 25 requires a new sample while the high speed circuit is clocking samples into the array. Immediately after the precursor arrives from the transmitter, a total of L new samples are clocked into the CCD from the high speed sample/hold device 23. The hold device 62 is deactivated when the CCD is full, making it transparent to the circuit and allowing the slow speed sample/hold circuit 25 to continue clocking samples directly from the CCD array.

Some of the design requirements of the system will now be discussed.

A critical design parameter, the compression factor, must be chosen so that the range of delay spread in the multipath radio environment is transformed to the range of delay spread in the natural acoustic environment. Small compression factors are undesirable since the signal will show narrowband behavior including flat fading if the bandwidth is too small. With too large a compression factor, the impulse response of the radio channel may be spread out too far during expansion. This makes the multipath echoes noticeable to the listener, as if the conversation were held in a large empty room or cave. Subjective testing is required to find the maximum practical compression factor for a given application without the delay spread becoming objectionable.

Although single sideband (SSB) modulation is the preferred modulation method due to its linearity and bandwidth efficiency, other methods are possible. Double sideband (DSB) modulation is another linear modulation scheme that will work with this invention, but with only half the bandwidth efficiency. DSB modulation also results in a poorer signal to noise ratio than SSB for a given transmit power. This is different from the common narrowband case where SSB and DSB modulation produce the same SNR [6]. The difference comes in the way that the upper and lower sidebands combine within the DSB receiver. With narrowband systems, the upper and lower sidebands fall within the coherence bandwidth of the radio channel and combine coherently within the receiver. In this wideband system, the sidebands are separated by more than the coherence bandwidth of the channel and must be treated as independent stochastic signals and combined non-coherently. Non-coherent combining results in only about half the signal energy of coherent combining therefore wideband DSB receivers suffer a 3 dB SNR penalty. Wideband SSB receivers do not combine sidebands and are not subject to this penalty. Vestigial sideband (VSB) modulation is another effective modulation technique, however it suffers the same bandwidth and SNR penalties as DSB, to a lesser degree. Whether SSB, DSB, or VSB is used, the carrier tone must be suppressed. Since the carrier tone is a narrowband signal, it is susceptible to flat fading and there is no guarantee that it will make it to the receiver. Therefore, transmitting such a tone within a spread spectrum signal is an unnecessary waste of power. Amplitude modulation requires a carrier tone so it is not suitable for this invention. Nonlinear modulation techniques such as frequency and phase modulation do not preserve the multipath distortion characteristics of the channel and sound unnatural.

In order to transmit the signals required for this invention, the linear power amplifier 16 must be able to handle relatively high powers for short duty cycles. For example, to transmit an average power of 10 mW with a compression ratio of a thousand, the radio actually transmits 10 W with a 0.1% duty cycle. The power amplifier should be able to quickly go in and out of low power standby mode, under control of the microcontroller 30, to conserve energy between packets.

The length of the voice segments is limited by the allowable delay through the system and the length of the precursors. As shown in FIG. 1, the delay through the system is roughly the length of an uncompressed voice segment. To keep the two-way delay reasonable for a normal conversation, the voice segment length should be less than 100 ms. At the other extreme, excessively shortening the segment length causes bandwidth efficiency to suffer as the precursor consumes a larger percentage of transmission time.

REFERENCES

[1] J. G. Proakis, "Digital Communications", second edition, McGraw-Hill, 1989.
[2] J. L. Flanagan, "Voices of Men and Machines", Journal of the Acoustic Society of America, vol. 51, pp. 1375–1387, March 1972.
[3] J. E. Flood and D. I. Urquhart-Pullen, "Time-Compression-Multiplex Transmission", Proceedings of the IEE, vol. 111, no. 4, pp. 647–668, April 1964.
[4] M. I. Jacob and J. Mattern, "Time-Compressed Single-Sideband System (Ticoss)", IRE Transactions on Communications Systems, vol. CS-6, pp. 2–8, June 1958.
[5] J. E. Flood and D. I. Urquhart-Pullen, "Gated Capacitor Store for T.C.M. Transmission", Proceedings of the IEE, vol. 111, no. 4, pp. 669–674, April 1964.
[6] A. B. Carlson, "Communication Systems: An Introduction to Signals and Noise in Electrical Communication", third edition, McGraw-Hill, 1986.

I claim:

1. A method of radio communication, the method comprising the steps of:
   time compressing a speech signal to form a time compressed speech signal;
   time multiplexing the time compressed speech signal with digital control signals to generate a TCM signal, the speech signal being compressed sufficiently to avoid flat fading without producing noticeable multipath echoes in a speech signal recovered from the TCM signal; and
   transmitting the TCM signal to a receiver.

2. The method of claim 1 in which time compressing the speech signal comprises forming the speech signal into voice segments and time compressing the voice segments to form time compressed voice segments.

3. The method of claim 2 further comprising the step of:
   adding a precursor to each voice segment before transmitting the voice segment.

4. The method of claim 3 in which transmission of the TCM signal results in a delay spread of each voice segment and the precursor of each voice segment has a length in time that is greater than or equal to the delay spread.

5. The method of claim 1 in which transmitting the TCM signal comprises:
   modulating the TCM signal to radio frequencies using a linear modulator.

6. The method of claim 1 further comprising the steps of:
   receiving the TCM signal at a receiver;
   decoding the digital control signals in the TCM signal;
   sampling a segment of the TCM signal to recover the time compressed speech signal; and
   restoring the speech signal by expanding the time compressed speech signal.

7. The method of claim 2 in which a digital control signal is multiplexed with each voice segment.

8. The method of claim 7 in which each time compressed voice segment and its associated digital control signal occupy a frame.

9. The method of claim 8 in which each frame has a length equal to the length of the voice segment that was compressed to form the time compressed voice segment that occupies the frame.

10. The method of claim 9 in which, in each frame, the time compressed voice segment is placed at a fixed offset from the start of the digital control signal preceding the time compressed voice segment in the frame.

11. The method of claim 6 further comprising the step of:
    varying amplification of the TCM signal based on measuring the power level of the digital control signals.

12. Apparatus for radio communication, the apparatus comprising:
    a time compression circuit connected to receive a speech signal and having as output a time compressed speech signal, the time compression circuit having a compression factor that maps radio channel delay spread to acoustic delay spread;
    a multiplexer connected to receive the time compressed speech signal and a digital control signal and having as output a TCM signal; and
    a transmitter connected to receive and broadcast the TCM signal.

13. The apparatus of claim 12 in which the time compression circuit comprises in series connection:
- a first sample and hold circuit;
- a storage circuit; and
- a second sample and hold circuit.

14. The apparatus of claim 13 in which the first sample and hold circuit operates at a slower sample rate than the second sample and hold circuit.

15. The apparatus of claim 12 in which the multiplexer comprises:
- a switch and a controller for the switch, the switch being operable to connect sequentially to the time compression circuit and to a source of data under control of the controller.

16. The apparatus of claim 12 in which the transmitter comprises a linear modulator.

17. Apparatus for radio communication, the apparatus comprising:
- a receiver connected to receive a TCM signal including a time compressed signal and a control signal;
- a controller connected to receive the control signal; and
- a time decompression circuit connected to receive the time compressed signal and having as output a time expanded speech signal, in which the time expanded speech signal is expanded from a compression factor selected to map radio channel delay spread.

18. The apparatus of claim 17 in which the time decompression circuit comprises in series connection:
- a first sample and hold circuit;
- a storage circuit; and
- a second sample and hold circuit.

19. The apparatus of claim 18 in which the first sample and hold circuit operates at a faster sample rate than the second sample and hold circuit.

20. The apparatus of claim 17 in which the receiver comprises a linear demodulator.

21. The method of claim 5 in which the linear modulator is a single sideband modulator.

22. The apparatus of claim 16 in which the linear modulator is a single sideband modulator.

23. The apparatus of claim 20 in which the linear demodulator is a single sideband demodulator.

24. A method of radio communication, the method comprising the steps of:
- time compressing a speech signal to form a time compressed speech signal by forming the speech signal into voice segments and time compressing the voice segments to form time compressed voice segments;
- adding a precursor to each time compressed voice segment before transmitting the time compressed voice segment;
- time multiplexing the time compressed speech signal with digital control signals to generate a TCM signal; and
- transmitting the TCM signal to a receiver using a linear modulator.

25. The method of claim 24 in which the linear modulator is a single sideband modulator.

26. The method of claim 24 in which transmission of the TCM signal results in a delay spread of each voice segment and the precursor of each voice segment has a length in time that is greater than or equal to the delay spread.

27. The method of claim 24 in which the speech signal is compressed to map radio channel delay spread to acoustic delay spread.

28. The method of claim 24 further comprising the steps of:
- receiving the TCM signal at a receiver;
- decoding the digital control signals in the TCM signal;
- sampling a segment of the TCM signal to recover the time compressed speech signal; and
- restoring the speech signal by expanding the time compressed speech signal.

29. The method of claim 24 in which a digital control signal is multiplexed with each voice segment.

* * * * *

UNITED STATES PATENT AND TRADEMARK OFFICE
CERTIFICATE OF CORRECTION

PATENT NO. : 6,606,312 B1
DATED : August 12, 2003
INVENTOR(S) : G. McGibney

It is certified that error appears in the above-identified patent and that said Letters Patent is hereby corrected as shown below:

Column 8,
Line 21, "the step of." should read -- the step of: --

Column 9,
Line 27, "delay spread." should read -- delay spread to acoustic delay spread. --

Signed and Sealed this

Thirtieth Day of December, 2003

JAMES E. ROGAN
*Director of the United States Patent and Trademark Office*